United States Patent [19]

Russell et al.

[11] Patent Number: 4,738,151

[45] Date of Patent: Apr. 19, 1988

[54] PINION COUPLING

[75] Inventors: Charles R. Russell, Whiteland; Gebus Barnsfather, Taylorsville, both of Ind.

[73] Assignee: Reliance Electric Company, Greenville, S.C.

[21] Appl. No.: 6,476

[22] Filed: Jan. 23, 1987

[51] Int. Cl.[4] .......................... F16D 1/06; F16L 17/00; F16L 29/00
[52] U.S. Cl. ........................................ 74/431; 403/15; 403/379
[58] Field of Search ................. 74/421 A; 403/15, 16, 403/273, 31, 379, 360

[56] References Cited

U.S. PATENT DOCUMENTS

| Re. 29,968 | 4/1979 | Geese et al. | 403/15 |
|---|---|---|---|
| 1,879,779 | 9/1932 | Wilkinson | 403/273 |
| 1,949,643 | 3/1934 | Bannan | 74/421 A |
| 2,010,057 | 8/1935 | Buckwalter | 403/15 |
| 2,036,389 | 4/1936 | Bannan | 74/421 A |
| 2,671,262 | 3/1954 | Kuniholm | 403/15 |
| 2,720,691 | 10/1955 | Kuniholm | 403/15 |
| 2,946,610 | 7/1960 | Jenness | 403/15 |
| 3,033,597 | 5/1962 | Miller | 403/15 |
| 3,061,342 | 10/1962 | Feller | 403/15 |
| 3,190,681 | 6/1965 | Liebe | 403/15 |
| 3,937,096 | 2/1976 | Lundin et al. | 74/421 A |
| 4,375,926 | 3/1983 | Feller | 403/15 |

FOREIGN PATENT DOCUMENTS

| 608998 | 5/1978 | U.S.S.R. | 403/15 |
|---|---|---|---|
| 619710 | 8/1978 | U.S.S.R. | 403/15 |

Primary Examiner—Lawrence Staab
Attorney, Agent, or Firm—Dority & Manning

[57] ABSTRACT

A drive connection between a drive pinion and a motor shaft. The motor shaft has a longitudinal axial bore into which is force-fitted a pinion shaft which is preferably integral with the pinion. The pinion shaft is shorter in length than the length of the bore in the motor shaft and connects with said motor shaft bore therebeyond to define a cavity between the end of the pinion shaft and the bottom of the bore when the shaft is fully fitted within the bore. A second bore extends from the surface of the motor shaft into the cavity area of such longitudinal bore and has a fitting associated therewith for the selective introduction of a fluid under pressure into the cavity to force the pinion shaft out of the bore for disconnecting the pinion from the motor shaft.

In one embodiment, both the axial bore and the pinion shaft have a constant diameter. In another embodiment the longitudinal bore has a stepped diameter and the pinion shaft has a stepped diameter corresponding to the bore diameter. A locking pin may be utilized to secure the pinion shaft to the motor shaft. The fluid may generally be any non-compressible fluid, such as grease, hydraulic fluid, oil, water or the like, and may be introduced into the cavity with commonly available devices such as a grease gun or the like.

5 Claims, 1 Drawing Sheet

PINION COUPLING

BACKGROUND OF THE INVENTION

This invention relates to coupling and decoupling of pinions and shafts.

Traditionally, pinions, particularly overhung pinions adapted for use with integral gearmotors, have been very difficult to remove from the shafts to which they are drivingly coupled. Removal may be occasioned by the need for servicing or for changing the gear size of the pinion. Typically in gear motor installations an integral shaft of a pinion is force-fitted (i.e. interference fit) into a longitudinal bore of the motor shaft. Heretofore, removing the pinion has required it to be forced out of the motor shaft. This has often required specialized tools for extracting the pinion, during use of which damage can occur to the pinion and/or the drive shaft.

Further specialized equipment is often required in initially fitting a pinion shaft into a longitudinal bore of a drive shaft. Since an interference fit is often used (thereby requiring tight tolerances between the pinion shaft and the drive shaft bore), the aforementioned specialized equipment must be used to help guide the pinion shaft into such bore since it can not independently support itself during such fitting.

The present invention recognizes and addresses such drawbacks, and others, of prior pinion coupling arrangements.

SUMMARY OF THE INVENTION

It is one object of the present invention to provide a drive connection between a drive shaft and a pinion shaft which is secure but which is also readily and safely disconnected.

It is another object of this invention to provide such a secure drive connection between a pinion and a shaft, but which can be disconnected without requiring tools except those normally available in a typical machine shop.

It is a further object of this invention to provide a pinion coupling not only not requiring specialized tools for disconnecting same, but also one not requiring special fixtures or equipment for initially guiding the elements to be coupled.

These objects, and others which will become apparent, are in one exemplary aspect of this invention attained by the provision of a pinion which has a shaft which may be force-fit into a matching longitudinal bore of a drive shaft, with such shaft having another bore therein adapted to permit the introduction of pressurized fluid into a cavity defined at the back of the longitudinal bore of the motor shaft for forcing the pinion shaft outward from the bore of the motor shaft.

In accordance with another embodiment of this invention, such pinion shank and motor shaft longitudinal bore may be respectively stepped so that the pinion shank may be loosened from its interference fit even without being completely withdrawn from such bore.

It is expected that those of ordinary skill in the art will recognize various modifications and variations to features and embodiments of this invention described herein, and all such variations are intended to come within the spirit and scope of the present invention.

BRIEF DESCRIPTION OF THE DRAWINGS

The objects set forth herein and other objects, advantages, and features of the invention will become apparent upon reference to the full and enabling disclosure thereof set forth in the specification, with reference to the attendant drawings, in which.

DESCRIPTION OF THE PREFERRED EMBODIMENTS

Figure 1:
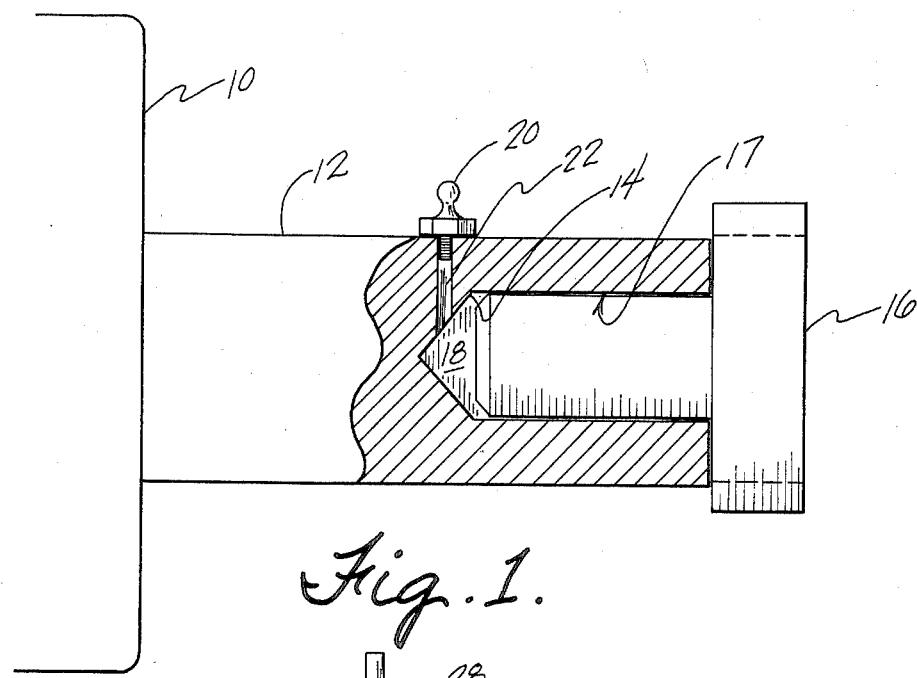
FIG. 1 is a front elevation, partially in section, illustrating one exemplary embodiment of a coupling device constructed in accordance with the present invention.

In FIG. 1, wherein a first embodiment of the invention is illustrated, gear motor 10 has a motor shaft 12. Motor shaft 12 has an elongated axial bore 14 which has force-fitted thereinto a shaft 17 of a pinion 16. Pinion shaft 17 in general is shorter than motor shaft bore 14. Hence, even when pinion shaft 17 is fully seated within motor shaft bore 14, a shaft cavity 18 is present at an inner end thereof. Motor shaft 12 further includes a bore 22 which extends from an outer surface of shaft 12 into communication with cavity 18.

Bore 22 is preferably transverse to axial bore 14 for direct radial penetration into shaft 12, but alternative constructions may be practiced so long as a means (other than bore 14) is provided for gaining access to cavity 18. At the surface of shaft 12, transverse bore 22 is preferably fitted with an appropriate fitting 20, e.g. a grease fitting, to provide for controlled introduction of fluids into cavity 18.

Whenever it is desired to remove pinion 16 from its connection with motor shaft 12 as illustrated by FIG. 1, a fluid under pressure is pumped through fitting 20 via bore 22 into cavity 18. The fluid selected preferably is a non-compressible substance, such as grease or hydraulic fluid. For example, where grease is utilized the pinion may be removed from motor shaft 12 merely by pumping grease through fitting 20 with a commonly available grease gun until the pressure of the grease within cavity 18 overcomes the resisting force generated by the interference or force-fit between the pinion shaft and the motor shaft longitudinal bore, thereby forcing the pinion shaft out of the motor shaft bore.

Figure 2:
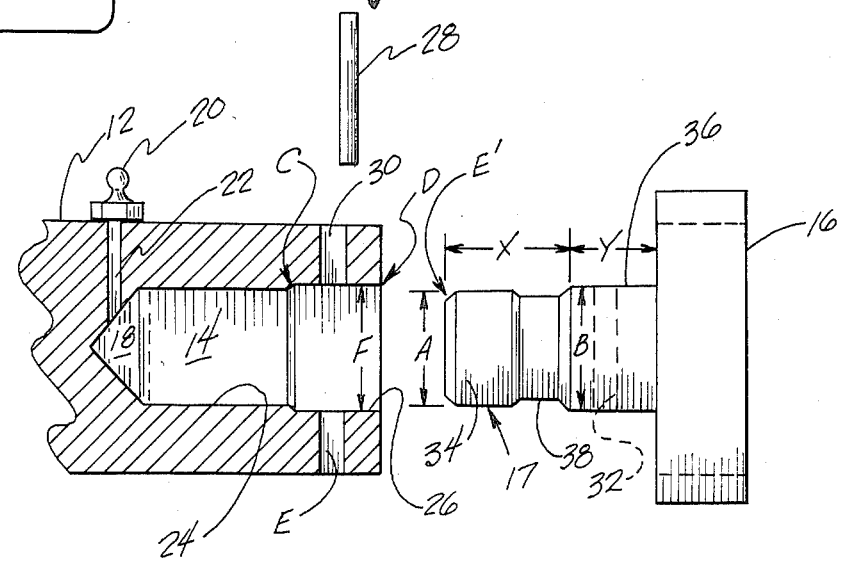
FIG. 2 is an exploded front elevation partially in section, of a second exemplary embodiment of a coupling device constructed in accordance with the present invention.

FIG. 2 shows a second embodiment constructed in accordance with the present invention. Like reference characters identify same or analogous features of the invention as in FIG. 1. This embodiment is particularly advantageous for use with pinions which are further coupled to motor shafts with connecting pins, as further discussed hereinbelow.

Motor shaft 12 is provided with a longitudinal bore 14 which has bore portions 24 and 26 of different diameters. Pinion shaft 17, has a corresponding reduced diameter A portion 34 and an increased diameter B portion 36. A further reduced diameter portion 38 may optionally be provided to improve the FIG. 2 embodiment, as discussed below. The diameter of portion 36 is preferably only slightly larger than the diameter of portion 34. Portion 34 of pinion shaft 17 is adapted to be force-fit into portion 24 of motor shaft longitudinal bore 14, while portion 36 of pinion shaft 17 has a diameter that is adapted to be force-fit into portion 26 of longitudinal motor shaft bore 14. Obviously, portion 38 does not frictionally engage any portion of bore 14.

In order to guarantee that the pinion does not rotate within motor shaft bore 14, a locking pin 28 is often driven into a locking pin bore 30 formed in motor shaft 12 (including bore E) and also through a locking pin bore 32 formed in pinion shaft 17, thereby providing a positive drive connection between such pinion shaft and motor shaft.

If a feature such as locking pin bore 30 were used with the present FIG. 1 embodiment, an escape path for fluids such as grease introduced into cavity 18 via bore 22 would be provided once the end of shaft 17 was pushed outwardly an amount adequate to clear radial bore 30. Thus, pinion 16 having a straight shaft 17 could not be fully loosened from a straight bore having a locking pin feature, but could be partially removed thereby, after which conventional tools could be employed for further and complete removal.

Present FIG. 2 is particularly adapted for performing even with a coupler having a locking pin feature. In particular, the location of locking pin bores 30 and 32 relative stepped bore 14 and matching stepped shaft 17, together with the illustrated relationship of length X of pinion shaft portion 34 being longer than length Y of pinion shaft portion 36, permits the full expulsion of the pinion shaft end E' from within bore portion 24 point C before any of the fluid introduced into cavity 18 can escape through bore 30.

For example, whenever it is desired to remove pinion 16 from its connection with the motor shaft, locking pin 28 is first removed. After such removal, fluid under pressure is injected into cavity 18 via transverse bore 22 through fitting 20. As the force created by such fluid under pressure overcomes the frictional resistance between the respective contacting surfaces of bore 14 and pinion shaft 17, shaft 17 is forced outward along bore 14. Whenever portion 34 of pinion shaft 17 reaches the enlarged or increased diameter F portion 26 of bore 14, i.e. whenever point E' of pinion shaft 17 passes point C of bore 14 and the angled end of pinion shaft portion 36 passes point D of bore 14, the pinion shaft and pinion can then be removed by conventional tools or even by hand.

The slightly larger bore portion 26 is also very helpful during initial assembly of the pinion and motor shaft since it allows the pinion shaft to be at least partly supported by the motor shaft bore (shaft portion 34 freely received in bore portion 26) without the usual requirements of a special fixture to help guide a straight pinion shaft into a straight bore of a motor shaft.

Further reduced diameter shaft portion 38 also facilitates introduction and removal of a pinion shaft into and out of, respectively, a motor shaft longitudinal bore. Since portion 38 is not in contact with the inside diameter of bore 14, friction between shaft 17 and bore 14 is that much less, which facilitates such introduction and removal. Also, portion (i.e. indent) 38 facilitates manufacture of pinion 16 since it does not have to have its diameter precision formed, as do shaft portions 34 and 36.

In each of the illustrated embodiments of the invention, a fluid under pressure is pumped into cavity 18 to force the pinion shaft out of the longitudinal bore of the motor shaft. This fluid can be the conventional grease used for lubricating machine parts and the grease can be pumped in with the ordinary grease gun. However, it is to be understood that other fluids could generally be used so long as they are non-compressible.

It is apparent to one of ordinary skill in the art from the foregoing that various features of the present invention improve manufacturing and use (both coupling and de-coupling) of a motor shaft/pinion shaft coupling construction.

While two exemplary embodiments of the invention have been described herein using specific terms, such description is for illustrative purposes only, and it is to be understood that changes and variations may be made therein and practiced therewith without departing from the scope or the spirit of the following claims.

What is claimed is:

1. A drive connection between a drive pinion and a motor shaft, comprising:
   (a) a motor shaft, having a stepped longitudinal bore therein, an inner portion of said bore being of one diameter and an outer portion of said bore being of a slightly larger diameter than said inner portion;
   (b) a pinion having a shaft secured thereto and extending outwardly therefrom, said pinion shaft being shorter in length than said motor shaft longitudinal bore, said pinion shaft having a first portion adjacent said pinion of one diameter and a second portion adjacent an outer face end of same of a smaller diameter, said diameters being adapted for interference fits with the respective diameters of said motor shaft axial bore portions, said end of said pinion shaft and the inner end of said longitudinal bore of said motor shaft defining a cavity in said motor shaft bore adjacent an end of said pinion shaft when said pinion shaft is fitted within said axial bore, and said pinion shaft second portion having a longer longitudinal length than said pinion shaft first portion;
   (c) a second bore defined in said motor shaft, extending from an outer surface thereof into said longitudinal bore in communication with said cavity said second bore being adapted for receipt of a fluid, which fluid may pass into said cavity to force said pinion shaft out of said axial bore for disconnecting said pinion from said motor shaft; and
   matable transverse bores defined by said motor shaft bore outer portion and said pinion shaft first portion for removably receiving a pin therein for locking said pinion to said motor shaft; wherein
   the relative lengths of said pinion shaft first and second portions, and the axial location of said matable transverse bores, cooperate during forced fluid disconnecting to ensure complete loosening of the respective portions of said pinion shaft from their respective interference fits within said motor shaft axial bore without escape of fluid from said motor shaft axial bore through said matable transverse bores.

2. A drive connection as set forth in claim 1, wherein said second bore has a fitting secured thereat for association with said fluid.

3. A drive connection as set forth in claim 2, wherein said fitting is a grease fitting.

4. A drive connection as set forth in claim 1, wherein said matable transverse bore is located relatively adjacent the juncture of said inner and outer portions of said longitudinal bore.

5. A drive connection as defined in claim 1, wherein said pinion shaft includes a third diameter section located between said large and small diameter section, said third diameter section being free of contact with said motor shaft when said pinion shaft is inserted in said longitudinal bore thereof.

* * * * *